(12) United States Patent
Smoot et al.

(10) Patent No.: US 9,656,422 B2
(45) Date of Patent: May 23, 2017

(54) THREE DIMENSIONAL (3D) PRINTER WITH NEAR INSTANTANEOUS OBJECT PRINTING USING A PHOTO-CURING LIQUID

(71) Applicant: DISNEY ENTERPRISES, INC., Burbank, CA (US)

(72) Inventors: Lanny S. Smoot, Burbank, CA (US); Alexander Hsing, Glendale, CA (US); Daniel Reetz, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 445 days.

(21) Appl. No.: 14/519,471

(22) Filed: Oct. 21, 2014

(65) Prior Publication Data

US 2016/0107380 A1 Apr. 21, 2016

(51) Int. Cl.
  *B29C 67/00* (2017.01)
  *B33Y 10/00* (2015.01)
  *B33Y 30/00* (2015.01)

(52) U.S. Cl.
  CPC .......... *B29C 67/0062* (2013.01); *B33Y 10/00* (2014.12); *B33Y 30/00* (2014.12)

(58) Field of Classification Search
  CPC ................................................. B29C 67/0062
  See application file for complete search history.

(56) References Cited

U.S. PATENT DOCUMENTS

| 6,947,584 B1* | 9/2005 | Avila | G06T 19/00 |
| | | | 128/916 |
| 2012/0258187 A1* | 10/2012 | Widman | B29D 11/00442 |
| | | | 425/174.4 |

FOREIGN PATENT DOCUMENTS

CN   103425035 A   * 12/2013

OTHER PUBLICATIONS

STIC Search History, USPTO, Mar. 28, 2017.*

* cited by examiner

Primary Examiner — Alison L Hindenlang
Assistant Examiner — Jamel M Nelson
(74) Attorney, Agent, or Firm — Marsh Fischmann & Breyfogle LLP; Kent A. Lembke

(57) ABSTRACT

An apparatus or three dimensional (3D) printer is provided for generating a 3D object. The apparatus includes a print chamber and a liquid print matrix such as a photo-curing resin positioned in the print chamber. The apparatus includes an optical assembly focusing light into the print chamber in the form of a real image whose light initiates curing processes for a volume of the liquid print matrix to form the 3D object. The light focused into the print chamber has a wavelength within a wavelength curing range for the photo-curing resin. The real image may be formed using an optical assembly reflecting or redirecting and focusing light reflected from outer surfaces of an existing 3D object. The real image may also be provided in the form of a volumetric image displayed by a volumetric display device displaying planes of a 3D digital model or image of a 3D object.

16 Claims, 5 Drawing Sheets

THREE DIMENSIONAL (3D) PRINTER WITH NEAR INSTANTANEOUS OBJECT PRINTING USING A PHOTO-CURING LIQUID

BACKGROUND

1. Field of the Description

The present invention relates, in general, to fabrication of three dimensional (3D) objects, and, more particularly, to a 3D printer adapted to provide nearly instantaneous printing via selective curing of a volume or portion of a photo-curing liquid, such as a photopolymer used to provide a fluid print matrix, with the cured volume/portion corresponding to a shape defined by a digital model of a 3D object or a direct, optically transferred, real image of the 3D object.

2. Relevant Background

Presently, 3D printing is a fabrication technology in which objects (or "printed 3D objects") are created from a digital file, which may be generated from software such as a computer aided design (CAD) program or another 3D modeling program or with a 3D scanner to copy an existing object that provides input to a 3D modeling program. To prepare the digital file for printing, software that is provided on a printer-interfacing computer or running on the 3D printer itself slices or divides the 3D model into hundreds to thousands of horizontal layers. Typically, only the outer wall or "shell" is printed to be solid such that a shell thickness may be defined as part of modifying the 3D model for use in printing. Then, during printing, the shell is printed as a solid element while the interior portions of the 3D object are printed in a honeycomb or another infill design, e.g., to reduce the amount of material that has to be printed to provide the printed 3D object.

When the prepared digital file of the 3D object is uploaded into the 3D printer, the 3D printer creates or prints the object layer-by-layer. The 3D printer reads every slice (or 2D image) from the 3D model and proceeds to create the 3D object by laying down (or printing) successive layers of material until the entire object is created. Each of these layers can be seen as a thinly sliced horizontal cross section of the eventually completed or printed 3D object.

One of the more common 3D printer technologies uses fused deposition modeling (FDM) or, more generally, fused filament fabrication (FFF). FDM printers work by using a plastic filament (e.g., acrylonitrile butadiene styrene (ABS) or polylactic acid (PLA) provided as strands of filament that is 1 to 3 millimeters in diameter) that is unwound from a spool mounted onto the printer housing. The plastic filament is used to supply material to a print head with an extrusion nozzle, e.g., a gear pulls the filament off the spool and into the extrusion nozzle. The extrusion nozzle is adapted to turn its flow on and off. The extrusion nozzle (or an upstream portion of the print head) is heated to melt the plastic filament as it is passed into the extrusion nozzle so that it liquefies. The extrusion nozzle deposits the liquefied material in ultra fine lines, e.g., in lines that are about 0.1 millimeters across.

The extrusion head and its outlet are moved, in both horizontal and vertical directions to complete or print each layer of the 3D model, by a numerically controlled mechanism that is operated by control software running on the 3D printer, e.g., a computer-aided manufacturing (CAM) software package adapted for use with the 3D printer. The extruded melted or liquefied material quickly solidifies to form a layer (and to seal together layers of the 3D object), and the extrusion nozzle is then moved vertically prior to starting the printing of the next layer. This process is repeated until all layers of the 3D object have been printed.

Presently, 3D printing is extremely slow and time consuming. For example, it may take several hours to print a single 3D object even if the 3D object is relatively small (e.g., a 3D object that is only several inches in diameter and four to twelve inches tall). The 3D printing process that uses conventional 3D printers such as an FFF-based 3D printer is limited in its speed by the speed of the mechanism moving the print heads to each new position on a print layer. Hence, there remains a need for 3D printing methods, and 3D printers that implement such methods, that can generate a 3D object with increased speed while retaining or even improving on the quality of the 3D object.

A further problem with existing 3D printing techniques is the need for printing a support structure for any overhanging components of a 3D object. For example, a figurine of a human-like character may have its arms extending outward from its body or torso, and the arms would be cantilevered out from the body or overhang from the adjacent portions of the body. A support structure would have to be included in layers printed below or in advance of the overhanging components or portions of the 3D object to provide material upon which to print the overhanging components. This slows the printing process further as a significant amount of material may have to be printed to provide the support structure. Upon completion of printing, the 3D object requires finishing including removal of the support structure and, in some cases, sanding or polishing of the surfaces from which the support structure was removed to match the finish of adjacent surfaces. These additional steps also increase the production time of the 3D object and typically must be performed manually, which further increases fabrication costs and complexities. Hence, it would be desirable to provide a 3D printing method, and associated 3D printer, that can "print" a 3D object without the need for support structures for overhanging or cantilevered features.

SUMMARY

Briefly, a 3D printer (and corresponding 3D print method) is described that is adapted for "printing" or generating a 3D object in a manner that circumvents the layer-by-layer approach of conventional 3D printers that has significantly limited achievable printing speeds. In one design approach, the 3D printer is configured with the assumption that a physical "original" of a 3D object already exists (not just a digital model of a 3D object). In this first 3D printer design, the 3D printer acts as a high speed 3D copying machine because it uses an optical assembly or a set of optics that relays a volumetric real image (versus a virtual image) of the existing or target 3D object into a vat or container holding a volume of a photo-curing liquid or resin (e.g., a photopolymer or photo-cure liquid polymer).

The light associated with the volumetric real image, which is provided by one or more light sources directing light onto the existing or target 3D object, causes a portion or volume of the photo-curing liquid to be cured in a nearly instantaneous manner to generate or produce the entire 3D object (rather than slowly and layer-by-layer as with conventional 3D printers). The printed or produced 3D object, which is floating in or supported in the uncured liquid (e.g., a resin selected to be translucent to transparent to light and also viscous to support the in-process 3D object), can simply be lifted out of the vat/container. In several testing operations, a 3D printer using photo-curing liquids has been proven effective in generating 3D objects in several minutes or less rather than in several hours.

More particularly, an apparatus or 3D printer is provided for generating (or "printing" in a nearly instantaneous manner) a physical three dimensional (3D) object. The apparatus includes a print chamber with one or more sidewalls enclosing an interior void adapted for containing liquids, and a liquid print matrix (such as a photo-curing resin or liquid, which may be a photopolymer or the like) positioned in the interior void of the print chamber. The apparatus includes an optical assembly operating to focus light into the interior void of the print chamber to initiate curing processes for a volume of the liquid print matrix to form a 3D object. The light focused into the print chamber has a wavelength within a wavelength curing range for the photo-curing resin.

In some cases, the photo-curing resin is transmissive (e.g., translucent to transparent) of light having a wavelength in the wavelength curing range when in liquid form and when in hardened form. In the same or other embodiments, the photo-curing resin has a first specific gravity in a liquid form and a second specific gravity when cured, and the second specific gravity may be in a range of 90 to 110 percent of the first specific gravity. In this way, the formed 3D object is supported by adjacent uncured portions of the photo-curing resin in the print chamber, and no supporting structure has to be printed for cantilevered or overhanging object features (such as arms of a figurine).

In some embodiments of the apparatus, the light focused into the print chamber displays or provides a real image defining at least an outer shell of the 3D object. In these cases, the apparatus may include a light source illuminating outer surfaces of a target 3D object, and the optical assembly may include a first curved mirror receiving and reflecting light reflected from the outer surfaces of the target 3D object and further include a second curved mirror receiving and reflecting the light reflected from the first curved mirror as the light focused into the print chamber. The curved mirrors may be parabolic mirrors or reflectors to implement the apparatus.

In other implementations, the optical assembly may include a curved mirror, a light source directing light through the curved mirror, and a rotation mechanism rotating the curved mirror and the light source along a circular path about a target 3D object. In such an apparatus, the light source illuminates a plurality of vertical strips or lines of outer surfaces of the target 3D object as the light source and the curved mirror are moved along the circular path (e.g., to provide circumferential scanning). The curved mirror is configured to reflect light reflected from the outer surfaces of the target 3D object to provide the light focused into the print chamber, e.g., to provide a plurality of real image strips or slits of light that accumulate in the print chamber to provide a 3D real image of the target or existing 3D object being copied by operation of the apparatus.

Alternatives to curved mirrors may include refractive optical systems, which can include focusing lenses that are able to generate a real image of the object, or portions of the object, to be copied and are also able to focus it into the print chamber. It should be understood that although the attached figures illustrate embodiments using curved mirrors the analogous optical function accomplished with focusing lenses may be applied to successfully practice the invention(s) described herein.

In some embodiments of the apparatus or 3D printer, the real image displayed in the print chamber or vat is a volumetric image displayed by a volumetric display device. In such embodiments, the volumetric image can be defined by a 3D digital model that includes numerous frames used to sequentially display a plurality of real image display planes (or slices or layers of the overall 3D real image) in an image space coinciding with the interior void of the print chamber. This causes near-concurrent curing of a plurality of layers or planes within the liquid print matrix contained in the print chamber to form or print the 3D object.

DETAILED DESCRIPTION

The inventors recognized that existing or conventional 3D printers, such as FFF-based 3D printers, are extremely slow in printing a 3D object. Further, conventional 3D printers require that support structure must be printed for any overhanging portions of the 3D object, which further slows the printing process and requires post-printing fabrication steps to remove the support structure. To address these and other issues with conventional 3D printers, a 3D printer (or 3D object generation system) is taught herein that, instead of building up an object by creating successive layers, builds or forms a 3D object by concurrently curing a volume or portion of a photo-curing liquid (e.g., a photopolymer resin).

In some embodiments, an existing 3D object is copied, and the 3D printer includes a light source for illuminating the existing 3D object and an optical assembly for generating (reflecting and/or redirecting light) a real image from light reflected from the 3D object. The light corresponding to the real image is directed into a print chamber or vat of the photo-curing liquid (and this volume may be thought of as a liquid print matrix) for a time falling within a curing range for the photo-curing liquid, which is usually a relatively short time such as several minutes or less to provide nearly instantaneous "printing" or forming of a 3D object in the print chamber. The cured volume of the photo-cure liquid may correspond with the outer surfaces of the target or existing 3D object so as to provide a solid outer shell (e.g., a hollow 3D object is printed).

In other embodiments, a volumetric image is projected or displayed within the photo-curing liquid or resin of the print chamber using a real image source, which may provide spatially offset frames defining a 3D image or volumetric image of a target 3D object. For example, a volumetric display device may be used to provide the light used to cure the photo-curing resin ("the curing light"), and, in this way, an outer shell may be formed or printed and, optionally, an internal structure or in-fill may also be formed. These embodiments of the 3D printer (and associated 3D print methods) may be used to create things that are not in the physical world or are not available for scanning or copying, and the 3D printers may be used to provide internal features/elements that cannot be copied by illuminating outer surfaces of an existing 3D object.

Figure 1:
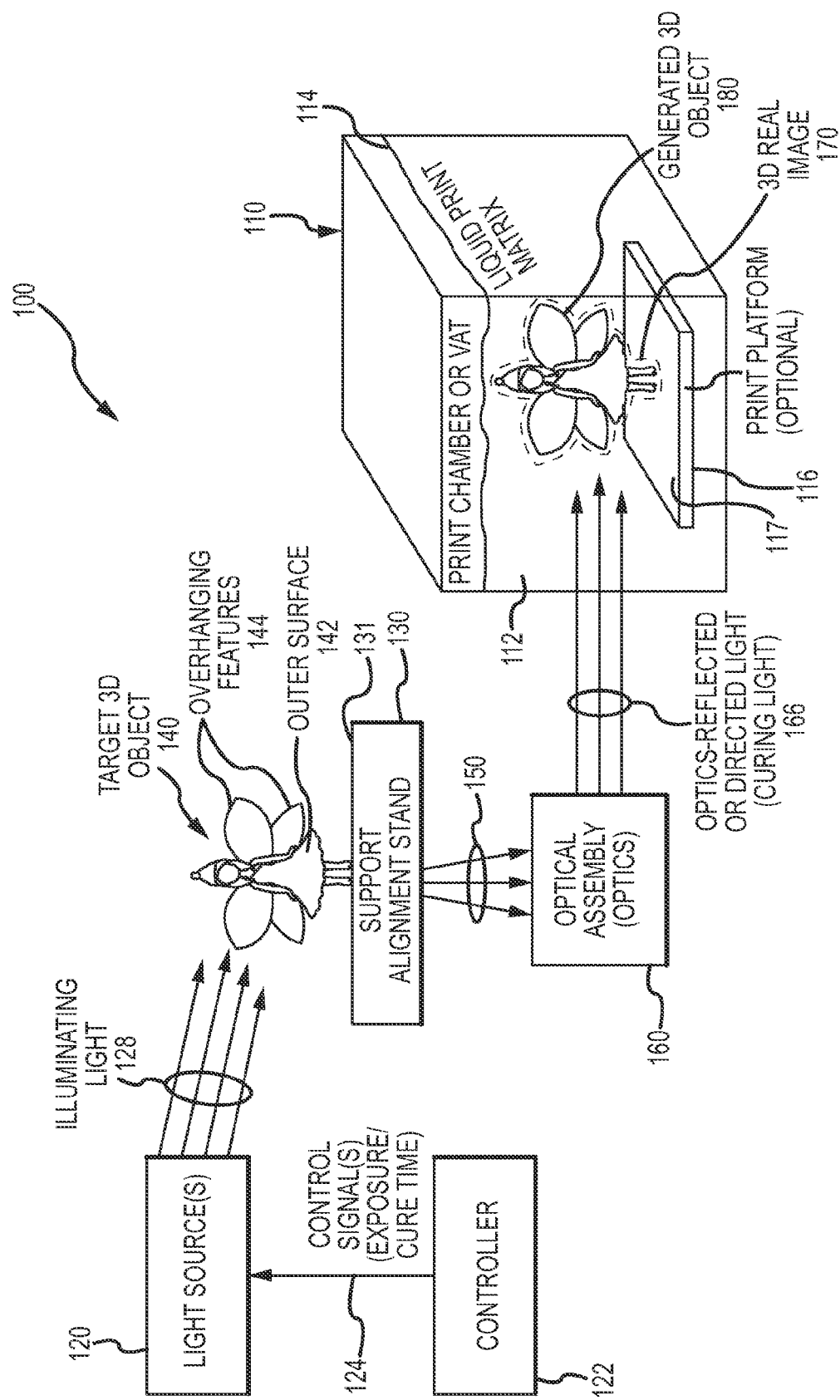
FIG. 1 is a functional block diagram of a 3D printer (or 3D object generation system) during its use or operation to print or create a 3D object.

FIG. 1 is a functional block diagram of a 3D printer or 3D object generation system 100 during printing or building operations to create a 3D object 180. As shown, the 3D printer 100 includes a print chamber or vat (or container) 110 with one or more sidewalls 112 that are adapted to contain a volume of a photo-curable resin (or a liquid print matrix) 114, e.g., a volume that is greater than a volume of cured material required to obtain the generated 3D object 180. The print chamber 110 may be rectangular in shape as shown or take another form such as a cylinder. The sidewalls 112 (or at least one sidewall) is transparent (or substantially so) to light to allow curing light 166 to be directed into a plurality of depths in the liquid print matrix 114 to allow light with sufficient brightness or energy to be provided in the interior void of the print chamber to cure a portion or volume of the matrix 114 to create the 3D object 180.

The liquid print matrix 114 may take a plurality of forms to practice the 3D printer 100. Generally, the liquid print matrix 114 is made up of a liquid that is light transmissive to allow a real image 170 to be created within the chamber 110 via light of a particular wavelength or energy. In some embodiments, the liquid used for the print matrix 114 is also chosen to have a minimum viscosity such that uncured portions of the liquid print matrix 114 function to support portions of the 3D object 180 as they are being formed or "printed" including any cantilevered or overhanging elements (e.g., overhanging features 144 on the target 3D object 140). In some cases, a print platform 116 is provided in the chamber 110, and its upper surface 117 is used to support lower portions of the 3D object 180 as it is being formed by curing a portion or a volume of the liquid print matrix 114. In some embodiments, the matrix 114 is provided by placing a volume of a photopolymer or other photo-curing resin or liquid into the print chamber or vat 110.

Prior to turning to other components of the 3D printer, it may be useful to discuss more generally the process of curing the print matrix 114 to form a 3D object 180. In a first approach, the 3D object 180 is generated by curing a subset or portion (or a volume) of the liquid print matrix 114 by projecting or displaying a 3D real image 170 in the vat 110. To this end, particular properties are preferred for the photo-curing resin used to provide the liquid print matrix 114. The resin can contain photoinitiators that absorb a certain wavelength of light, which initiates a crosslinking or polymerization process to happen where the real image is the brightest (e.g., outer surface of the 3D real image 170). This causes the polymer to physically harden or to be cured.

The resin can cure at either a visible or invisible wavelength. This depends on the wavelength absorbed by the photoinitiator. In prototype testing of a 3D printer like the one shown in FIG. 1 at 100, the inventors cured photo-curing resin using blue light (wavelength of approximately 450 nm), violet light (wavelength of approximately 405 nm), and ultraviolet light (wavelength of approximately 365 nm). Resins that cure with invisible wavelengths are less affected by ambient light, which may make them useful in some 3D printers 100.

The resin for print matrix 114 should be selected to both absorb and transmit light (be transmissive) at the curing wavelength. Higher absorption results in a faster rate of curing, but it also provides a shorter maximal curing depth in the print chamber 110. The maximal curing depth determines the size of the largest object that can be cured. Higher transmission results in a slower rate of curing, but it also provides a greater maximal curing depth, which may be desirable in some 3D printers 100. These two competing parameters of the photo-curing resin used for the print matrix 114 mean that there exists a tradeoff between curing rate and the maximum size for the cured object 180.

The threshold for curing depends on the wavelength as opposed to the intensity of light. This is because the interaction between light and photoinitiators is quantum mechanical in nature. Light intensity only determines the rate of curing, but it has no bearing on whether the curing process is started. Assuming a sufficient density of photoinitiating molecules, the curing rate scales linearly with light intensity. Ideally, a resin would have a curing rate of zero below a certain intensity threshold. Such a resin would have a highly nonlinear curing rate as a function of intensity, ideally approaching a step function. Hence, it is desirable to have the 3D real image 170 be provided with curing light 166 of a wavelength suited to the particular photoinitiators of the photo-curing resin (e.g., within a predefined curing wavelength range) and also above a minimum curing intensity (with nearby portions of the matrix 170 being exposed to lower intensity light). In this way, the curing process will be initiated at the location of the 3D real image 170 at a relatively quick curing rate (e.g., several minutes or less) to limit or avoid curing of nearby portions of the matrix 114.

In some preferred implementations of the 3D printer 100, the specific gravities of the cured and uncured resin should be as close to each other as possible. This is to ensure that the position of the cured portion of the resin (i.e., the generated 3D object 180) does not change with respect to position of the liquid resin during the curing process as this ensures or facilitates creation of a distortion-free cured object 180. Further, the indices of refraction of the cured and uncured resin should be as close to each other as possible. Depending on the shape of the object, it is highly likely that light will need to transmit through cured portions of resin. If the cured resin has a different index, light will refract and cause the image to distort. Still further, the photo-curing resin undergoes a chemical reaction during the curing process. This chemical reaction should be as isothermal as possible so as not to induce temperature gradients inside the vat 110. Such temperature gradients would cause the uncured resin to flow, which distorts the cured object. In reality, most photo-curing resins are exothermic to some degree, and this can place an upper limit on curing rate. Hence, there is likely an inherent tradeoff between the curing rate and print resolution due to temperature gradients inside the vat 110 of resin 114.

A different approach to selectively curing a portion or volume of the liquid print matrix 114 to generate the 3D object 180 is to use dual-wavelength excitation. In this embodiment of the 3D printer, the photo-curing resin used would include phosphors that absorb at two wavelengths and emit a third wavelength, the resin's curing wavelength. These phosphors would be mixed into the resin and emit the wavelength necessary for curing. Such phosphors exist and can be engineered for photo-curing applications. In this approach, two or more real images 170 can be projected 166 by an optical assembly 160 into the resin 114 using light 128, 150 of different wavelength. These images 170 would need to be accurately superimposed to generate the 3D object 180. In this implementation of the 3D printer 100, only resin 114 exposed to both wavelengths will cure, which both enhances curing rate and the maximum possible size of the cured object. The other aforementioned resin properties still apply in this approach.

Referring again to FIG. 1, the 3D printer 100 is shown to include one or more light sources 120 that are selectively operated or controlled by a controller 122 with control signals 124 (wired or wireless communications). The controller 122 may be a computer or computing device including a processor(s) that manages input/output (I/O) devices to allow user input (e.g., to initiate a print operation, to select a curing time, and so on). The processor of controller 122 may also manage one or more storage devices/memory that store executable instructions (e.g., a printing program) to generate the control signals 124. The control signals 124 may include or define a curing or exposure time for the matrix 114, and curing times for each of a plurality of potential photo-curing resins used to provide the liquid print matrix 114 may be stored in memory or data storage of the controller 122.

The light source(s) 120 is chosen to output illuminating light 128 with a wavelength falling in a curing wavelength range for the photo-curing resin 114 in the print chamber 110. Also, the illuminating light 128 provide by the light source(s) 120 is of an intensity that is greater than a predefined intensity needed to achieve a desired curing rate of the photo-curing resin 114 (e.g., great enough intensity to account for intensity losses through the 3D printer components to the 3D real image 170). The light source(s) 120 preferably is adapted to illuminate the entire outer surface 142 of a 3D object 140 targeted (or a target 3D object) for copying with the 3D printer 100, and, in this regard, two, three, or more bulbs or other components, positioned around or encircling the 3D object, may be included in light source 120 to direct the illuminating light 128 onto each and every side (except a bottom or base side in this example) of the 3D object 140.

The 3D printer 100 is shown to include a support or alignment stand 130 upon Which the target or existing 3D object 140 is positioned. For example, the stand 130 may include a planar upper surface 131 with one or more alignment markings provided to indicate a print position for the 3D object 140 to ensure light 150 reflected from its outer surface(s) 142 is directed by the optical assembly or optics 160 as curing light 166 fully into the liquid print matrix 114 in the print vat 110 (e.g., wholly place the 3D real image 170 within the liquid print matrix 114 to print a 3D object matching that of the target 3D object 140). One or more of the outer surfaces 142 of the 3D object 140 may be treated to provide equal or more equal reflection of the illuminating light 128 so that all the surfaces 142 are more equally represented in the object-reflected light 150 (e.g., to provide more equal illumination of all surfaces 142 of the object 140 and avoid some that may absorb more light 128, which may result in poorer quality 3D object 180 as portions of the real image 170 may not be as bright (or as well defined)).

The target 3D object 140 is shown to include one or more overhanging (or cantilevered) features 144, with wings and arms shown in FIG. 1, and, significantly, these features 144 do not require the generated 3D object 180 to include support structures as a portion or volume of the liquid print matrix 114 associated with the 3D real image 170 is nearly instantaneously cured and because the uncured portions of the matrix 114 underneath and nearby the overhanging features of the 3D object 180 act to support these forming or in-process features (e.g., due to the like specific gravities of the cured and uncured portions of the photo-curing resin chosen to provide the liquid print matrix 114 as discussed above).

The 3D printer 100 further includes an optical assembly or optics 160 that includes components that are selected and arranged to receive the object-reflected light 150 from the surfaces 142 of the target 3D object, and, in response, to reflect or direct light (i.e., curing light) 166 into the liquid print matrix 180 so as to display or project a 3D real image 170. As discussed above, the light 166 providing the 3D real image 170 has a brightness or intensity that is greatest at its portions corresponding to the outer surfaces 142 of the target 3D object 140 and that is greater than some predefined minimum intensity to achieve a desired curing rate. Also, the light 166 providing the 3D real image 170 is at a wavelength within a curing wavelength range for the photo-curing resin of the liquid print matrix 114.

The image 170 is a "real" image versus a "virtual" image. In optics, a real image is an image which is located in the plane of convergence for the light rays that originate from a given object. Examples of real images include the image seen on a cinema screen (the source being the projector), the image produced on a detector in the rear of a camera, and the image produced on an eyeball retina (the camera and eye focus light through an internal convex lens). A real image occurs where rays converge, whereas a virtual image occurs where rays only appear to converge. In other words, real images, such as 3D real image 170, are formed by actual light rays and, thus, can be used to cure the photo-curing resin or photopolymer 114 in the print vat 110. The optical assembly 160 may include concave mirrors and converging lenses when the object 140 is placed further away from the mirror/lens than the focal point, but this real image 170 may be inverted in the 3D printer or additional components or design steps may be taken to make the 3D real image not inverted if useful for obtaining a better quality 3D object (e.g., one with a missing side or surface in a base portion as shown in FIG. 1 rather than at an upper and likely exposed surface of the 3D object 180). If a viewer sees a reflected/redirected image 170 from the side in which the light rays leave the lens or mirror of the optical assembly 160, a real image is one on the same side of the lens or mirror as the viewer, whereas a virtual image is one on the opposite side of the lens or mirror.

Figure 2:
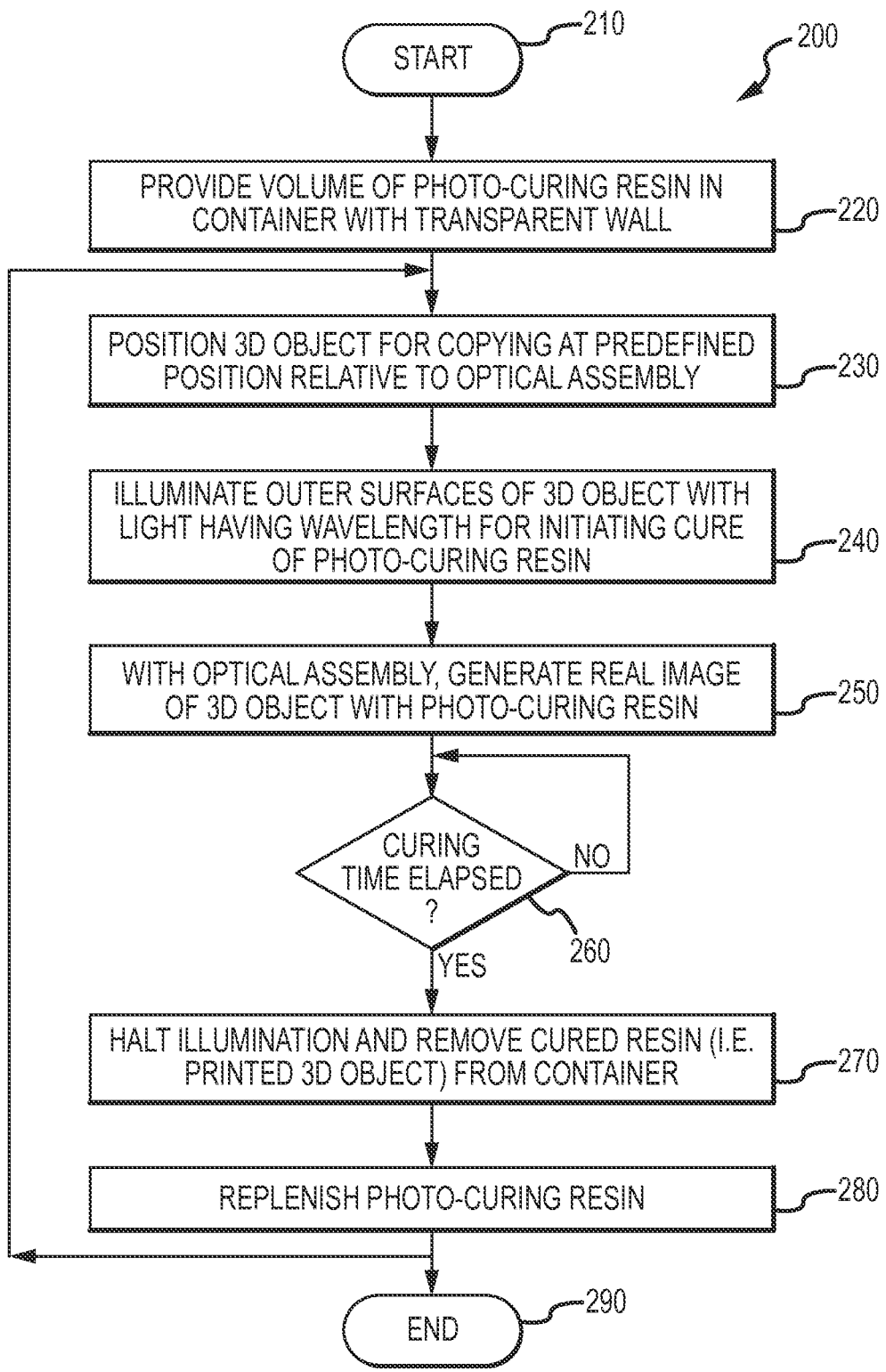
FIG. 2 is a flow diagram for a method of fabricating or printing a 3D object using a 3D printer of the present description such as the printer or object generation system of FIG. 1.

FIG. 2 illustrates a 3D print method (or object generation method) 200 of the present description, which may be carried out by operation and/or use of the 3D printer 100 of FIG. 1. The method 200 starts at 210 such as with the selection of a photo-curing resin for use in forming 3D objects by exposing a portion or volume of the photo-curing resin concurrently to light in the form of or defining a real image. Further, an optical assembly may be selected for creating real images of 3D objects in step 210 along with one or more light sources for illuminating all or most of the outer surfaces of the 3D objects with light that is useful for curing the selected photo-curing resin.

At 220, the method 200 continues with providing a volume of the photo-curing resin in a container. The volume of resin is chosen to provide enough material to form a chosen 3D object (e.g., the bigger the 3D object the more resin will be required and can be provided in step 220). The container provided in step 220 includes at least one wall or portion of a wall that is transparent (or substantially transmissive) to light in the wavelength range required for curing the photo-curing resin. Typically, one or more sidewalls of the container will be formed of a glass or clear plastic, ceramic, or the like to provide the desired level of light transmission.

At step 230, a 3D object is chosen for copying, and the 3D object is positioned at a predefined position and with a predefined alignment or orientation relative to the optical assembly of the 3D printer. In general, the 3D object printing location is one that allows light reflected from its surfaces to be received by the optical assembly at a desired level of intensity and then redirected with adequate focus into the photo-curing resin in the container.

At step 240, the method 200 continues with illuminating outer surfaces of the 3D object with light having a wavelength(s) that is useful for initiating the curing process of the photo-curing resin in the 3D printer's container or print chamber. For example, the photo-curing resin may have a curing wavelength range of 350 nm to 500 nm, and the light provided in step 240 may fall within this range, e.g., be light from a blue light source, from a violet light source, from an ultraviolet (UV) source, a combination of such sources, or the like. The light sources chosen to perform the illuminating step 240 are selected to provide light of an adequate intensity, even considering losses in the system, to exceed a predefined minimum light intensity to achieve a desired curing rate. Further, the light sources are positioned relative to the 3D object's print location/position to direct light onto all surfaces that are to be copied or included in the printed/generated 3D object (e.g., all surfaces, all surfaces except a base or supporting surface upon which the 3D object stands or is supported, and the like).

At step 250, the optical assembly is used to generate a real image or 3D real image of the 3D object illuminated in step 240 by receiving light reflected from the 3D object's surfaces and reflecting and/or redirecting the light. The generated 3D real image is displayed or projected within the photo-curing resin in the container via the transparent wall (or portion of a sidewall) of the container. Due to the wavelength of the light used to form the real image, the curing process is initiated, and this process generally occurs at the highest rate where the real image is the brightest (i.e., at the portions of the real image corresponding to the outer surfaces of the 3D object illuminated in step 240 with a properly designed optical assembly). At step 260, the method 200 continues with a determination of whether or not a time falling within the curing time range for the photo-curing resin has elapsed (e.g., this may vary with the intensity of the light but may range from 0 to 5 minutes or the like). If not, the method 200 continues at 260.

If the time has elapsed and the resin is fully cured by the real image light, the method 200 continues at 270 with halting the illumination of the 3D object with the light sources. Step 270 may also include removing the cured resin from the container, in other words, removing the generated or printed 3D object from the uncured photo-curing resin in the container. At step 280, the method 200 may continue with replenishing the photo-curing resin in the container such as by providing a replacement volume for that used to form the 3D object, by removing all resin and providing a new volume of the same or a different photo-curing resin in the container, and so on. The method 200 may end then at step 290 or may continue at 230 with positioning a new 3D object in the 3D printer or leaving the same 3D object in the printer and producing another copy of this object.

Figure 3:
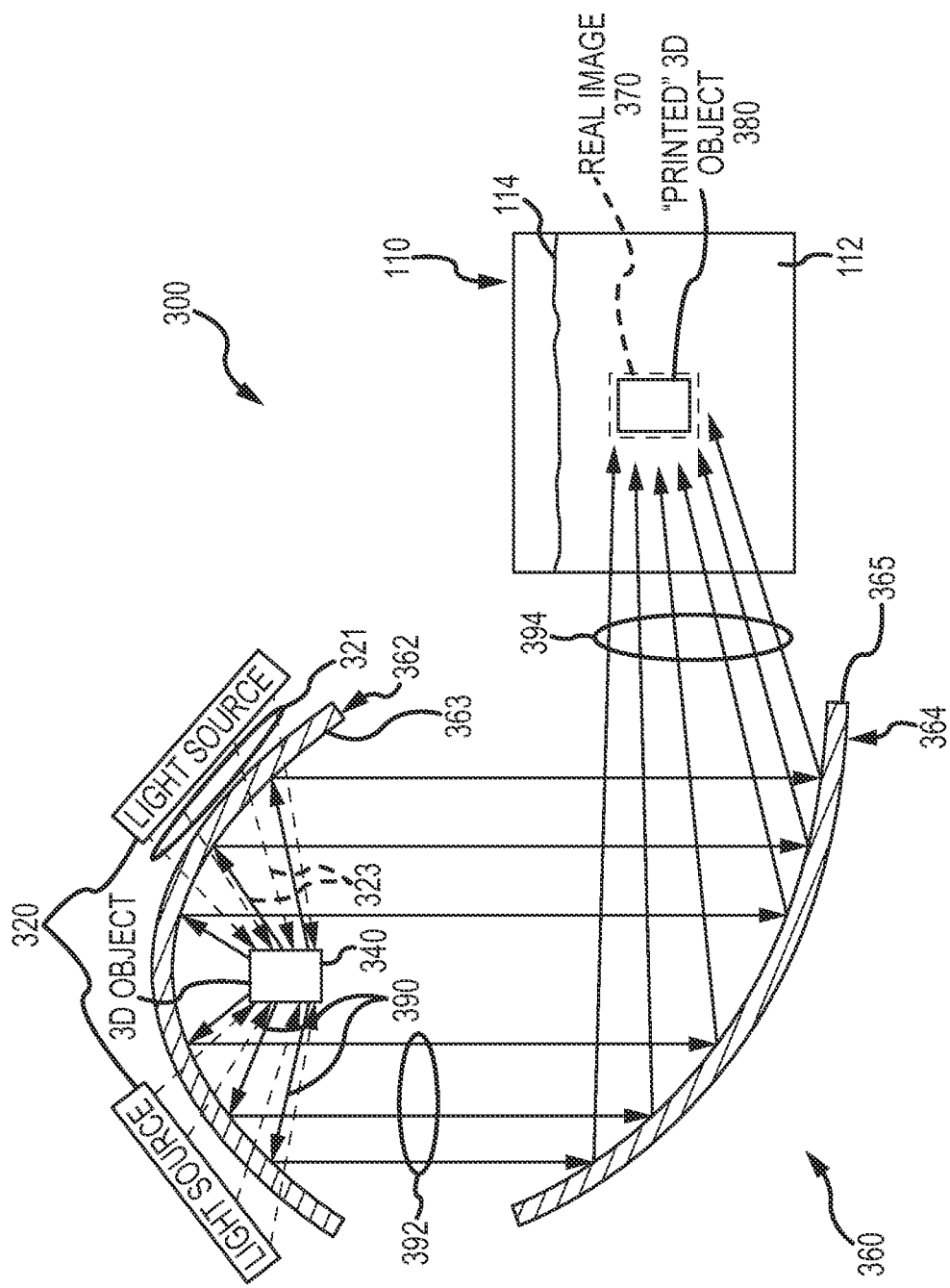
FIG. 3 is a side sectional and schematic view of a 3D printer with one exemplary optical assembly of the present description for providing a real image within a print chamber or vat of photo-curing resin.

FIG. 3 illustrates an implementation of a 3D printer 300 with an exemplary optical assembly 360 for proving a real image 370 to concurrently cure a volume or portion of a photo-curing resin to provide a "printed" 3D object 380. The printer 300 includes components found in the printer 100 of FIG. 1, and these components are provided with like reference numbers including a print chamber or vat 110 with transparent or light-transmissive sidewalls 112 and including a volume of photo-curing resin 114 in the print chamber or vat 110.

In the 3D printer 300, the optical assembly 360 is shown to include first and second curved (e.g., parabolic) reflectors or mirrors 362, 364. The 3D object 340 that is to be copied or printed with 3D printer 300 is placed at the focal point(s) of the first parabolic mirror 362. The 3D printer light sources 320 are provided on an opposite or back side of the mirror 362, and illuminating light 321 from the sources 320 is directed to one or more light passageways in the mirror 362 as shown with arrows 323 to illuminate or light the outer surfaces of the 3D object 340 (except for a base or bottom surface that may be facing away from the mirror 362). As discussed above, the illuminating light 321 is of a wavelength useful for curing the resin 114 (e.g., a wavelength within a curing wavelength range for the resin 114), and is also of an intensity or brightness to achieve a desired curing rate for the resin 114 (e.g., greater than a desired minimum intensity level to account for any losses in the optical assembly 360 and/or the vat 110 and resin 114 prior to forming the real image 370).

Because the 3D object 340 is placed at the focus of the mirror 362, its inner or reflective surface 363 receives the light 390 reflected from the outer surfaces of the object 340 and directs this light in parallel lines as shown at 392. The optical assembly 360 further includes a second parabolic reflector or mirror 364 for receiving the light 392 reflected by the first parabolic mirror 362. The second parabolic mirror 364 is arranged relative to the print chamber 110 and first parabolic mirror 362 such that its focal point or focus is within the print chamber 110 such as in the center or at a desired depth within the volume of photo-curing resin 114. This can be seen in FIG. 3 where the second reflected or redirected light 394 from the object 340 is focused or projected into the resin 114 in the print chamber 110 to form the real image 370. The light 394 is provided for a time falling within a curing time range for the resin 114 (at the wavelength and intensity of the light 394), and this causes a volume or portion of the photo-curing resin 114 to cure in the shape of or matching the outer surfaces of the 3D object 340 from which the light 390 was reflected as is shown with the printed 3D object 380. In this way, the optical assembly 360 is useful for creating in one step a 3D object 380 from an existing 3D object 340 (e.g., an outer shell or hollow bodied object based on the 3D object 340).

The 3D printer 300 of FIG. 3 may be thought of as providing an instantaneous (or nearly so with curing in 30 seconds to about 5 minutes or more) copier of physical objects using dual curved mirrors in its optical assembly optics that are used to provide or project a 3D real image. In this embodiment, two large parabolic mirrors may be used for reflectors 362, 364. The object 340 to be copied is placed at the focus of the first mirror 362. This first curved mirror 362 has a substantially "surrounding view" of the object 340. Parallel rays of light 392 leaving this parabolic mirror 362 (reflected from surface 363) are focused by a second parabolic mirror 364 into the center of a vat/chamber 110 of a transparent photo-curing liquid 114 as shown with arrows 394.

The liquid 114 hardens quickly when exposed to the light 394 that provides the real image 370. In one prototype, the inventors used a photo-curing resin specially formulated to provide a hardened/cured material providing 3D object 380

(the cured portion or volume of liquid 114) that has the same index of refraction as the non-hardened liquid 114. In this way, light 394 passing through one part of the object 380 to harden/cure another part of the 3D object 380 (e.g., passing through a surface proximate to the mirror 364 to a surface more distal to the mirror 364) is not affected (at least not to a degree significant to achieving similar curing effects in liquid 114) by passing through the first part of the cured and/or curing material of the 3D object 380.

In addition, the prototyped 3D printer 300 used a resin 114 with a specific gravity in the hardened/cured state that was the same or within a small range (e.g., within plus or minus 10 percent or the like) to the specific gravity of the resin or liquid 114 in the uncured or unhardened state. As a result of these matching or nearly matching specific gravities, the free floating printed object 380 stays in place in the container during the curing process and does not fall because of gravity, which allows objects 380 to be printed that include overhanging or cantilevered features or element without requiring printing of support structures or layers (as is the case with conventional 3D printers).

During the printing with the 3D printer 300, the object 340 is lit brightly by light 323, from light source(s) 320, having a wavelength at which the photo-curing resin 114 in the print chamber or vat 110 hardens (or for which curing processes are initiated), and the optical assembly 360 is configured to respond to the object illumination by producing a real image in the photo-curing resin or liquid 114. The object 340 typically is an opaque object with or without treated surfaces to provide uniform or more uniform reflectivity when struck by light 323, but a translucent object 340 can also be copied with 3D printer 300 such as through internal illumination (e.g., placing a light source(s) within the body of the 3D object 340). The real image 370 or light associated with or creating/providing the real image 370 acts to cure the resin 114 into a replica 380 of the original object 340.

In other embodiments of 3D printers, the optical assembly may include a single mirror element that is rotated about a 3D object to provide a circumferential scan of the 3D object's outer surfaces and the mirror element may be configured to focus or project a real image of all the scans into a print chamber and the photo-curing resin it contains. Particularly, a single, large, curved reflecting mirror may be provided in the optical assembly of the printer, and this mirror may be rotated about a central axis of the 3D object (or a platform or other element supporting the 3D object).

A light source is provided that provides a high-power strip or line of vertical light, with the light source being a laser (or lasers) in some useful implementations. The line or strip of illuminating light is reflected off one or more outer surfaces of the 3D object being printed or copied, and the rotating mirror acts to reflect the object-reflected light as it rotates about the circumference of the 3D object. The mirror is selected and/or configured to focus the reflected light into the photo-curing resin provided in the print chamber of the 3D printer, and the reflected light creates an aerial image of the slice or slit of the 3D object lit or illuminated by the vertical strip or line of light from the light source.

As the mirror and light source rotate around the 3D object, the focused strip or line of reflected light creates a cumulative real image in the form of a shell of the 3D object in the photo-curing resin in the print chamber or vat. This shell is a 3D copy of the outside surfaces or surface structure of the 3D object to be copied by the 3D printer. Alternatively, the object and vat (which may be placed above or below the 3D object in any of these embodiments) can be rotated in the 3D printer such as on a center stand in front of a fixed or stationary scanner, which includes the light source and the curved mirror.

In these embodiments of the 3D printer, the printing or curing of a portion or volume of photo-curing resin in a vat is nearly performed concurrently as in other embodiments especially when the mirror (or object and vat) are rotated at relatively high rotation rates. Since the application of light is not continuous, the curing rate may be somewhat slower with this embodiment of the 3D printer. However, this 3D printer design allows for the use of somewhat smaller optics (e.g., a smaller parabolic or curved mirror), and it will be useful for generating a copy of a 3D object in a time period that most would still consider to be "nearly instantaneous" such as a full curing time that is up to hundred times (or more) faster than previous techniques (especially since the 3D printer only prints the outside shell of the 3D object chosen for using in printing/copying).

Figure 4:
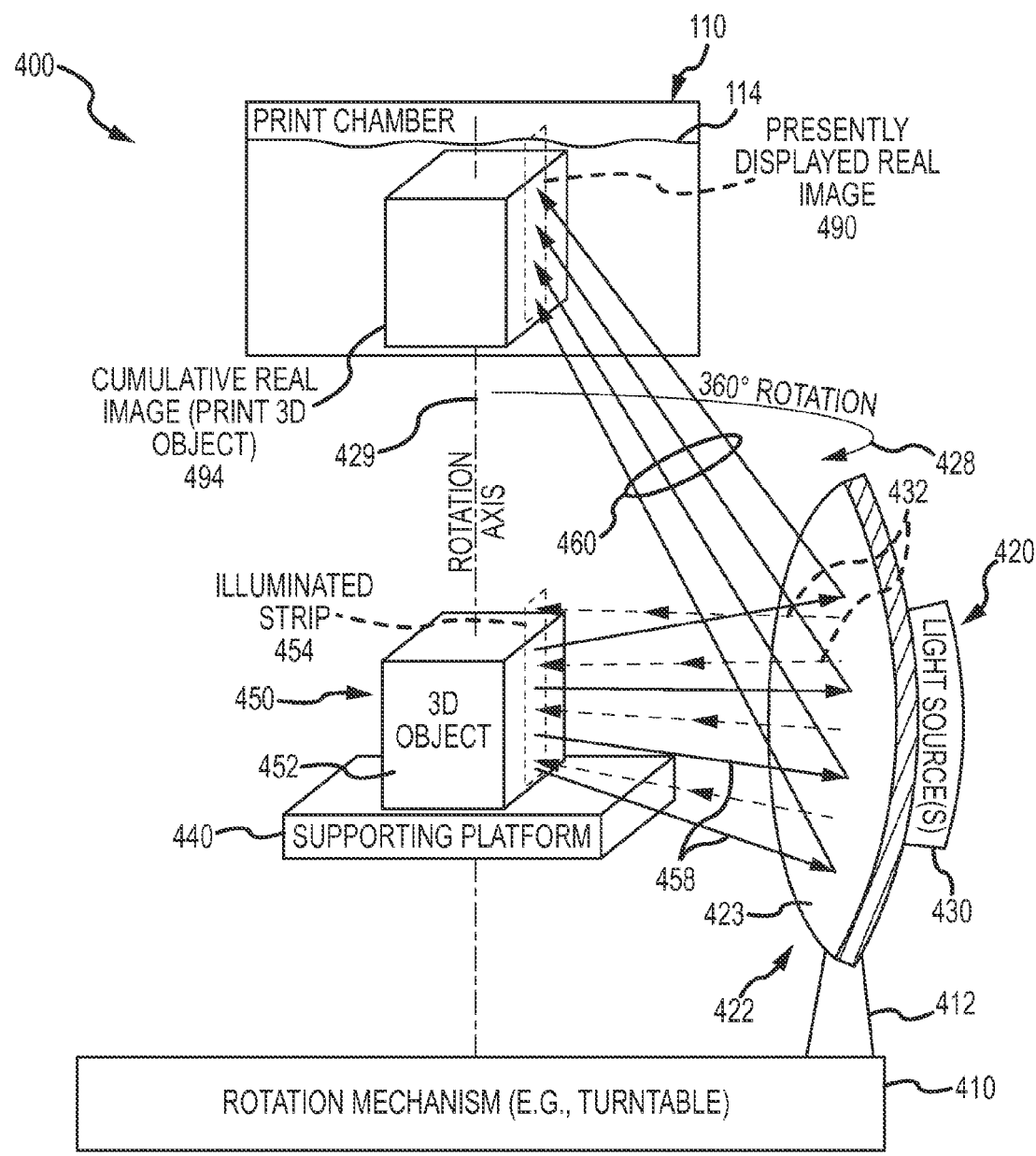
FIG. 4 is a functional block view showing another 3D printer using an optical assembly including a rotating curved mirror to provide real images in a vat of photo-curing resin.

FIG. 4 illustrates a 3D printer 400 that may be used to implement the circumferential scanning mirror concept discussed above to create real images useful for curing a photo-curing resin. As shown, the 3D printer 400 includes an optical assembly 420 with a rotation mechanism 410 such as a turntable or similar device with a mirror support 412. The optical assembly 420 includes a curved mirror (e.g., a parabolic mirror) 422 that is mounted to the mirror support 412 so as to allow the rotation mechanism to rotate the mirror 422 with its reflective or mirrored surface 423 (which faces inward or toward a rotation axis 429) about a rotation axis 429.

A light source(s) 430 (e.g., one or more lasers or the like) may be mounted on a back surface of the curved mirror 422, and a slit or elongated, linear light passageway (not shown) may be provided in the mirror 422 and its reflective surface 423 to allow the passage of a linear strip or line of illuminating light 432. The 3D printer 400 further includes a support and/or alignment platform 440 (which may be hanging or otherwise supported above (or below) the rotation mechanism 410) for receiving and supporting a 3D object 450 that has been selected for copying/printing by the 3D printer 400. The rotation axis 429 of the rotation mechanism 410 and mirror 422 may run through this platform 440 and, when in place on the platform, through the target 3D object 450. The platform 440, in this example, is stationary when the 3D printer 400 is operated to print a 3D object 494.

As shown during printing operations, the mechanism 410 functions to rotate, as shown with arrow 428, the scanning mirror 422 about 360 degrees about the rotation axis 429 and about the circumference of the 3D object 450. The light source 430 is concurrently operated to provide the vertical line or strip of illuminating light 432. As a result, a thin strip or line 454 is illuminated on the outer surfaces 452 of the 3D object 450 at each position of the mirror 422 and light source 430 during this rotation 428.

This causes a plurality of strips of light (object-reflected light) 458 to be reflected from the 3D object 450, and the mirrored surface 423 of the mirror 422 receives this light 458 and directs/focuses it as shown with arrows 460 toward the print chamber or vat 110 to provide a plurality of strips or displayed real images 490 in the photo-curing resin 114. These many real image or strips 490 when accumulated generate a whole real image 494 corresponding with the shell or outer surfaces 452 of the 3D object 452, and, when the portion or volume of the photo-curing resin 114 associated with (or at the location of) the whole real image 494 cures or hardens, the printed 3D object 495 is formed or "printed." The curing or hardening may take numerous rotations 428 of the mirror 422 about its rotation axis 429 and projections of the real images 490 into the resin 114.

In other embodiments of the 3D printers using photo-curing resin to provide nearly instantaneous printing of 3D objects, it may be desirable to utilize 3D real images that are created from digital files or other sources rather than from light reflected from existing 3D objects (e.g., real images not taken from a target 3D object as discussed with reference to FIGS. 1-4). In one example of such a 3D printer, the optical assembly (and controller 122 and light source(s) 120 of the printer 100 of FIG. 1) may take the form of a volumetric display device or system. There are a number of designs of volumetric display devices that may be utilized, with each generally acting to take a digital file defining a 3D object as input and displaying a 3D real image with volume in a display space. To practice the 3D printer, the position of the 3D real image or volumetric image would be chosen to be within the print chamber or vat or, more accurately, wholly within the liquid print matrix provided therein (e.g., at a depth within a volume of photo-curing liquid or resin). The light used to display the volumetric image is used to initiate curing to form the 3D object in a nearly instantaneous manner.

Figure 5:
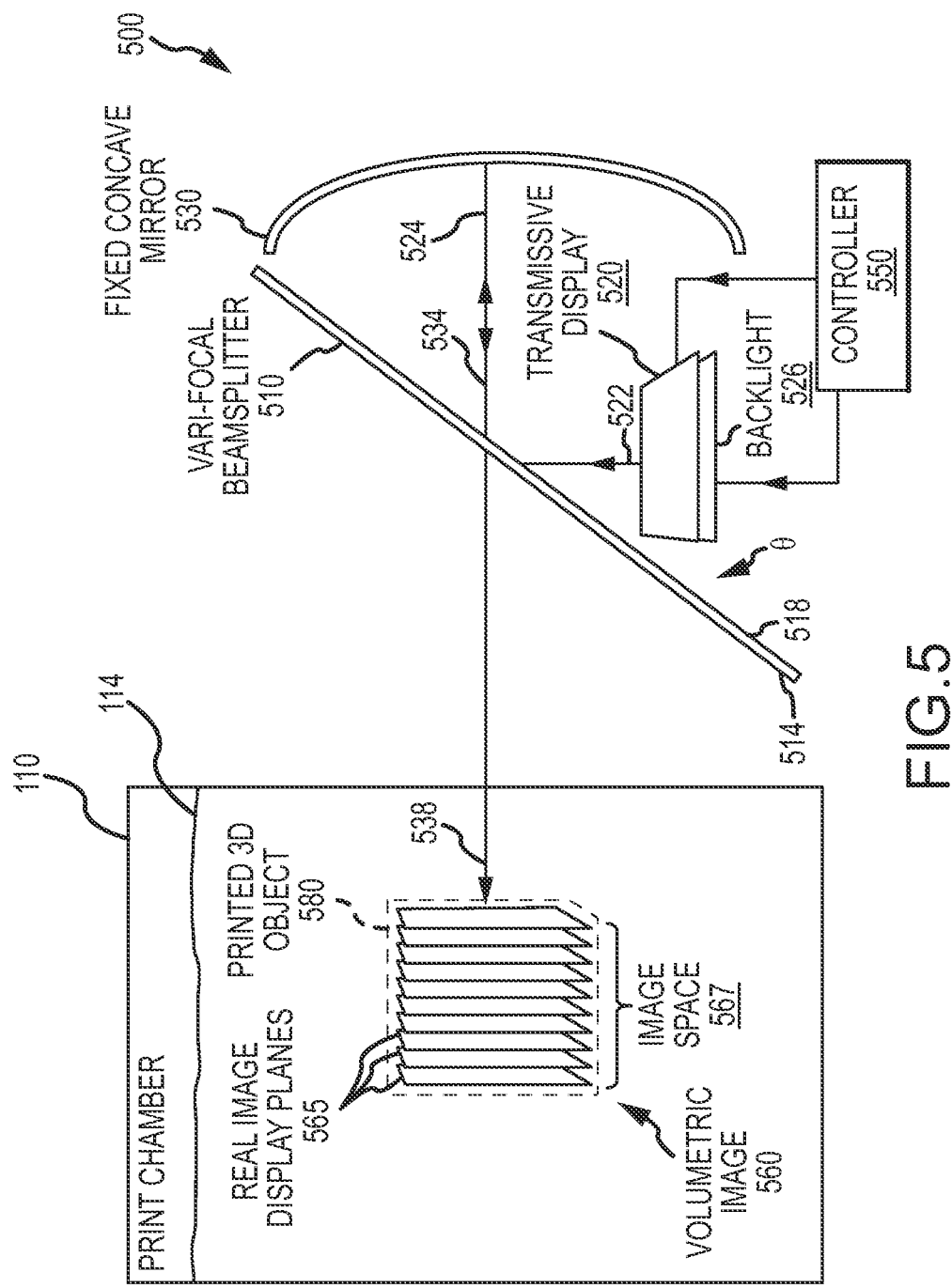
FIG. 5 is a functional block drawing of a 3D printer using a volumetric display device to display a volumetric image in a volume of photo-curing resin in a print chamber or vat to form a 3D object.

In one particular embodiment, one of the volumetric display devices taught in U.S. Patent Application Publication No. 2014/0028663 A1, which is incorporated herein in its entirety, is used to provide a volumetric image in a volume of photo-curing resin (or other liquid print matrix) so as to generate a 3D object from a digital image file (e.g., from an image of an object that may or may not exist in the physical world or without a need for copying of a physical object). FIG. 5 illustrates a 3D printer 500 incorporating one embodiment of volumetric display device 510 to provide a volumetric image using a vibrating mirror (or, more accurately, a vari-focal beamsplitter) to rapidly and essentially simultaneously image the layers of a computer-generated object (or image file) inside a vat or print chamber containing a photocuring polymer. In this way, existing objects defined by a digital file or even objects that never previously existed in the real world can be printed.

The 3D printer 500 may make use of the "varifocal" effect, which can be achieved with one or more inertial drivers that shake or vibrate the rim or frame supporting the beamsplitter, which is formed of a flexible sheet of reflective and transmissive material such as circular sheet of flexible aluminized polyester or Mylar® (such an arrangement is also called a scrim mirror). The image generator, which provides images to the backside of the beamsplitter, may be a transmissive display, such as an RGB liquid crystal (LC) panel, which is backlit by an addressable light source, such as an LED array, a high-speed video projector, or the like. In this manner, the volumetric display generates volumetric real images with addressable depth planes, such as at a block level with use of an LED array light source or at the pixel level with use of a high-speed video projector as the backlight for the transmissive display.

FIG. 5 illustrates with a schematic or functional block representation the 3D printer 500 with a volumetric display system. As shown, the 3D printer 500 includes a print chamber 110 as found in the system 100 of FIG. 1 which is filled with a liquid print matrix 114 such as a volume of photo-curing resin or liquid. All the other components of printer 500 shown in FIG. 5 are used to provide a volumetric image 560 in the liquid print matrix 114 to initiate its curing to form a printed 3D object 580, and these other components may be considered the volumetric display system (or optical assembly, light source, and controller as labeled in printer 100 of FIG. 1.

The volumetric display system of printer 500 includes a varifocal beamsplitter 510 arranged at an angle, θ, relative to horizontal such as an angle of 30 to 60 degrees (e.g., 45 degrees or the like), with such an angle being useful to present a volumetric image 560 along a targeting line to place the volumetric image 560 within the print chamber 110 and resin/liquid 114 (but other beamsplitter angles, θ, may be used for differing display axes to suit different applications).

The beamsplitter 510 is "varifocal" due to being shaken or vibrated such that it is planar (due to tensioning) when at rest or the 3D printer 500 not operating and then is cycled between a convex shape (outer or front side 514 curved outward a distance toward the print chamber 110) and a concave shape (front side 514 curved inward a distance (e.g., the same distance) away from the print chamber/vat 110). These movements may be considered "strokes" of the beamsplitter 510 and differing planes 564 of the volumetric image 560 are shown in the image space 567 (which coincides with the liquid print matrix 114 of chamber 110) during such strokes (e.g., all on the forward stroke, all on the back stroke, or a combination thereof) to provide the depth of the image space 567. The volumetric image is "real" because the space 567 is on the print chamber 110 side or out from the front side 514 of the beamsplitter 510 (rather than being a virtual image a distance behind the back side 518 of the beamsplitter 510).

As shown in FIG. 5, a set of source or input images 522 is provided by a screen of a transmissive display 520. The transmissive display 520 may take the form of an LC panel, and a controller 550 may provide black and white or full color images to the display 520 for use in generating image stream 522. All (or portions) of the transmissive display 520 is backlit by a backlight or light source 526. As discussed with reference to FIGS. 1-4, the light source 526 may be chosen to provide light 522 having a wavelength suited to the particular photo-curing resin or liquid 114 in the chamber 110 so as to initiate curing processes where the volumetric image 560 is displayed (e.g., of a wavelength falling in a curing wavelength range of a photopolymer or the like). Also, the intensity of the light 522 from backlight 526 through the display 520 may be chosen to be of a magnitude useful for achieving a desired cure rate (with higher intensities typically preferred to provide very rapid curing of the resin 114 to form a 3D object 580 in the vat 110). The backlight 526 is typically addressable such that portions or even pixels may be selectively backlit on the display 520, e.g., to form the print layers or real image display planes 565 that make up the volumetric image 560 in image space 567 and cause selective curing of the resin/liquid 114.

The controller 550 may use a depth map to control operation of the backlight 536 while using a high-resolution color map to control the transmissive display 520. These two maps may be synchronized, with each other and with vibration of the beamsplitter 510, to control the content of the input or source images 522 (defining a 3D object 580 to be printed with printer 500) and, consequently, the content of each real image display plane 565 in the volumetric image 560, e.g., what image is visible in each spaced apart real image plan 565 and what light will be provided in the chamber 110 to cure the resin/liquid 114 to form object 580. The spacing between planes 565 and the overall depth of the image space 567 is controlled by the deflection of the beamsplitter 510 and the timing of the backlight 526 in illuminating the transmissive display 520.

The source image 522 from the screen/surface of display 520 is directed to the back side 518 of the varifocal beamsplitter 510. A portion of this light (such as about 50 percent) is reflected as shown at 524 onto a reflective surface of a concave mirror 530 (which is fixed/rigid, unlike the beamsplitter/mirror element 510), and the concave mirror 530 is chosen to have a focal point for the received light 524 within the liquid print matrix 114 contained in the print chamber or vat 110 so as to provide a real image rather than a virtual image (e.g., a focal point defining the image space 567 in combination with movement or the stroke of the beamsplitter 510). The light 534 is reflected from the concave mirror 530 back toward the beamsplitter 510, which allows a portion 538 (such as 50 percent) to pass through to the print chamber or vat 110. This allows light associated with or used to provide the volumetric image 560 in the image space 567 to be used to initiate curing of the photo-curing liquid or resin 114 in the print chamber 110. Since only about 25 percent of the light from source 526 reaches the print chamber, it is typically preferable to use a high illumination source such as 300 to 2000 lumens (with 1500 or more typically being preferred) to achieve higher curing rates to quickly (e.g., in 30 seconds to 5 to 10 minutes or more compared with hours taken by conventional 3D printers) form or print the 3D object 580.

The image 560 is provided as a sequential number of real image display planes 565, which substantially concurrently cure differing volumes or portions of the resin/liquid 114 to provide a more solid 3D object 580. In some cases, a hollow shell can be provided by the planes 565 by displaying only outer layers of an object, but, in other cases, the interior space of the object 580 may be displayed to allow internal components of the object 580 to be printed, too. For example, a honeycomb in-fill may be provided by the layers/planes 565 or meshing/working components that are covered by an outer layer or shell may be provided by the image display planes 565. The greater the number of planes 565, the more "solid" the image 560 will appear and the more dense layers will be in the printed 3D object 580. However, the printer 200 can be practiced with as few as 2 to 3 planes up to 10 or more planes depending on factors such as the speed with which the backlight can vary which portions of the display screen 520 are illuminated (address sets of pixels or the like to define the differing content provided in each plane 565).

In one embodiment, the backlight 526 is an LED array configured such that each LED may be addressed and separately strobed such that one or more LEDs may be used by the controller 550 to backlight the transmissive display (e.g., an LC panel) 520. The size of the LED array may vary to suit the size of the LC panel 520 such as a 16 by 16 array of LEDs arranged in an addressable matrix. Light 522 from this LC/LED combination (520/526) is reflected by the beamsplitter 510, e.g., a half-silvered varifocal beamsplitter. A portion of the reflected light 524 is directed toward the fixed concave mirror 530. The concave mirror 530 focuses light 534 back onto and through 538 the beamsplitter 510, where it forms stacked real images 565 of the surface of the LC or transmissive display 520 in a space or location 567 within the liquid print matrix 114 of the print chamber 110 that is positioned in front of the varifocal beamsplitter 510 or its front side/surface 514. In one implementation, the mirror 530 is a fixed concave, f/2, 0.75 meter, diagonal mirror. This concave mirror 530 can be used to reflect the light 524 back through it as shown with arrows 534 and 538.

This concave mirror 530 can be used to provide up to an approximately 0.3 meter diagonal real image 560 extending out into the viewer space (shown with image space 567 that is located past the front surface/side 514 of the beamsplitter 510 in the resin/liquid 114). It should also be understood that the use of the concave mirror 530 also corrects a depth inversion issue inherent in some volumetric display systems.

In one exemplary implementation of the 3D printer, the primary image source or transmissive display 520 could be an off-the-shelf 15-inch diagonal LC panel with its backlight removed. The backlight 526 may be a custom-built 16 by 16 array of high brightness, white-light, diffused LEDs. This array 526 can then be used to illuminate the LC panel 520 at up to 320 depth planes per second. During each depth frame, selected LEDs were strobed for approximately 2 milliseconds to set depth plane positions (e.g., planes 565) in a volume (e.g., image space 567 of volumetric image 560). In one implementation, 8 depths (e.g., planes 565) could be independently selected in 556 separate areas (16 times 16), which may lead to an egg crate-type artifact that can be eliminated, if desired, through the use of a backlight 526 in the form of a high-speed projector providing light of a desired resin-curing wavelength (e.g., to allow pixel-by-pixel mapping of light to display 520).

To create the volumetric images 560, the controller 550 can be adapted to provide synchronization of the image on the LC display 520, the LED or other backlight 526, and the beamsplitter drive used to resonate the flexible mirror element or varifocal beamsplitter 510. In one prototype, such synchronization was achieved with a frame sync signal from which all other timing signals were derived. Particularly, a sine wave version of the frame sync was power amplified and used to drive the beamsplitter transducers/drives (which were connected in series). An adjustable delay line was used to adjust for a fixed phase delay due to the mirror/beamsplitter 510 dynamics. Backlight patterns for backlight 526, associated with 3D objects 580 to be printed, can be stored by the controller 550 and downloaded by a serial link to a microprocessor, and a pulse version of the frame sync was used to load the backlight frame data (e.g., used to control an LED array) from the microprocessor to the backlight (e.g., LED array) via a dedicated parallel data path.

The controllers described herein may be a desktop computer, a workstation, a laptop or pad computer, or other computer device operable by a user of the 3D printer to select and transmit a digital model to the display 520 for use in printing the 3D object 580. To this end, the controller may include a processor or central processing unit (CPU) that operates or manages input and output (I/O) devices such as a monitor, a touchscreen, a mouse, a keyboard, speakers, voice recognition devices, and the like that allow an operator or user of the controller 550 to provide user input. Particularly, the controller 550 may include memory devices or data storage components (e.g., non transitory computer readable medium) (or have access to such memory devices) that are managed by the processor to store one or more digital files that are used to print a 3D object 580. Also, the controller 550 may use the CPU to execute code or software (in computer readable medium such as RAM, ROM, or the like on the system 550) in the form of a 3D printer interface program.

In practice, the 3D printer interface program may be adapted to cause a series of interface screens to be presented by the controller 550 and its I/O devices to a user. The user may select a 3D object for printing by first generating a 3D model of a 3D object made up of a number of object elements, and this definition may also include setting a thickness for an outer shell of object and a structural infill (e.g., one or more honeycomb patterns). Then, during operations, the controller 550 is operable to communicate (wirelessly or in a wired manner) with the transmissive display 520 and backlight/light source(s) 526 including transmitting a frames of a digital model to print a 3D object 580 by operating the volumetric display device of the 3D printer 500.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, many of the examples provided herein perform imaging with curved mirrors, but the embodiments may be configured such that refractive lenses or other focusing optics may be used to create the real images used to "print" a 3D object with the 3D printers taught herein. In general, any optical system that is capable of creating a floating, aerial real image can be used in one of the 3D printers of this description.

The 3D printers provide a number of advantages over prior 3D printers. The 3D printers are inherently faster as they produce an object literally with a flash of curing light. The 3D printer are also more cost effective with regard to printing materials, especially in the case of a cylindrical or circumferential scan, since the 3D printers may be used to only create an outer shell of an object, which only uses the amount of photo-curing material required for this shell (and not an interior in-fill and, when needed, a support structure for cantilevered/overhanging elements) Some of the 3D printers are specially adapted for use in copying existing 3D objects while other 3D printers described herein can be used to create objects from images of 3D objects such as from outputs of 3D cameras or computer-generated images/models of objects.

There are many ways that the 3D "printing" may be achieved with a liquid print matrix (such as matrix 114 in FIG. 14), but it may be useful at this point in the description to discuss properties of photocuring resin and a couple of useful approaches for forming a 3D printer using a real image as taught herein.

In a first approach, curing an object by forming a 3D real image in a vat of photo-curing resin is achieved utilizing particular resin properties. The resin may be selected so as to contain photoinitiators that absorb a certain wavelength of light, which initiates a crosslinking or polymerization process. This causes the polymer to physically harden. The resin can cure at either a visible or invisible wavelength. This depends on the wavelength absorbed by the photoinitiator. The inventors have cured (formed a 3D object) using blue light (450 nm), violet light (405 nm), and ultraviolet light (365 nm). Resins that cure with invisible wavelengths are less affected by ambient light.

In this first printing approach, the resin acts to both absorb and transmit light at the curing wavelength. Higher absorption results in a faster rate of curing but also a shorter maximal curing depth. The maximal curing depth determines the size of the largest object that can be cured. High transmission results in a slower rate of curing but also a longer maximal curing depth. These two competing requirements mean that there exists a tradeoff between curing rate and the maximum cured object size.

The threshold for curing depends on the wavelength as opposed to the intensity of light. This is because the interaction between light and photoinitiators is quantum mechanical in nature. Light intensity only determines the rate of curing but has no bearing whether the curing process is started. Assuming a sufficient density of photoinitiating molecules, the curing rate scales linearly with light intensity. Ideally (or at least preferably in many applications), a resin would have a curing rate of zero below a certain intensity threshold. Such a resin would have a highly nonlinear curing rate as a function of intensity, ideally approaching a step function. If such a resin cannot be identified, a resin with properties approaching or nearer these ideal properties may be used in its place.

The specific gravities of the cured and uncured resin may be chosen so as to be as close to each other as possible. This is to ensure that the position of the cured portion of the resin does not change with respect to position of the liquid resin during the curing process, which is desirable to ensure a distortion-free cured object (and the inventors have identified resins with such properties). Additionally, it may be useful for the indices of refraction of the cured and uncured resin to be as close to each other as possible. Depending on the shape of the object, it is highly likely that light will need to transmit through cured portions of resin. If the cured resin has a different index, light will refract and cause the image to distort. Again, the inventors have identified resins with closely matched indices in both cured and uncured states. Further, the photo-curing resin undergoes a chemical reaction during the curing process. This chemical reaction should, hence (at least in many applications), be as isothermal as possible so as not to induce temperature gradients inside the vat. Such temperature gradients would cause the uncured resin to flow, which distorts the cured object. In practice, many photo-curing resins are exothermic to some degree, and this places an upper limit on curing rate. There is an inherent tradeoff between the curing rate and print resolution due to temperature gradients inside the vat of resin.

In another approach to 3D "printing," dual-wavelength excitation may be utilized to form a 3D object with a real image in a liquid print matrix (such as matrix 114 of FIG. 1). This approach could use phosphors that absorb at two wavelengths and emit a third wavelength, the resin's curing wavelength. One or more of such phosphors would be mixed into the resin and emit the wavelength necessary for curing. Such phosphors exist (are readily available) and can be effectively engineered for the photo-curing applications/printing processes taught herein. In this approach, two or more real images can be projected into the resin using light of different wavelength. These images would typically be accurately superimposed. Only resin exposed to both wavelengths will cure, which both enhances curing rate and the maximum possible size of the cured object. The other aforementioned resin properties still apply in this approach.

We claim:
1. An apparatus for generating a physical three dimensional (3D) object, comprising:
   a print chamber with one or more sidewalls enclosing an interior void adapted for containing liquids;
   a liquid print matrix positioned in the interior void of the print chamber;
   an optical assembly operating to focus light into the interior void of the print chamber to initiate curing processes for a volume of the liquid print matrix to form a 3D object, wherein the light focused into the print chamber displays a real image defining at least an outer shell of the 3D object; and a light source illuminating outer surfaces of a target 3D object, wherein the optical assembly comprises a first curved mirror receiving and reflecting light reflected from the outer surfaces of the target 3D object, and wherein the optical assembly further comprises a second curved mirror receiving and reflecting the light reflected from the first curved mirror as the light focused into the print chamber.

2. The apparatus of claim 1, wherein the liquid print matrix comprises a volume of a photo-curing resin.

3. The apparatus of claim 2, wherein the photo-curing resin comprises a photopolymer.

4. The apparatus of claim 2, wherein the light focused into the print chamber has a wavelength within a wavelength curing range for the photo-curing resin.

5. The apparatus of 4, wherein the photo-curing resin is transmissive of light having a wavelength in the wavelength curing range when in liquid form and when in hardened form.

6. The apparatus of claim 4, wherein the photo-curing resin has a first specific gravity in a liquid form and a second specific gravity when cured and wherein the second specific gravity is in a range of 90 to 110 percent of the first specific gravity, whereby the formed 3D object is supported by adjacent uncured portions of the photo-curing resin in the print chamber.

7. An apparatus for generating a physical three dimensional (3D) object, comprising:
a print chamber with one or more sidewalls enclosing an interior void adapted for containing liquids;
a liquid print matrix positioned in the interior void of the print chamber; and
an optical assembly operating to focus light into the interior void of the print chamber to initiate curing processes for a volume of the liquid print matrix to form a 3D object,
wherein the light focused into the print chamber displays a real image defining at least an outer shell of the 3D object,
wherein the optical assembly comprises curved mirror, a light source directing light through the curved mirror, and a rotation mechanism rotating the curved mirror and the light source along a circular path about a target 3D object, wherein the light source illuminates a plurality of vertical strips of outer surfaces of the target 3D object as the light source and the curved mirror are moved along the circular path, and wherein the curved mirror reflects light reflected from the outer surfaces of the target 3D object to provide the light focused into the print chamber.

8. The apparatus of claim 7, wherein the liquid print matrix comprises a volume of a photo-curing resin.

9. The apparatus of claim 8, wherein the photo-curing resin comprises a photopolymer.

10. The apparatus of claim 8, wherein the light focused into the print chamber has a wavelength within a wavelength curing range for the photo-curing resin.

11. The apparatus of 24, wherein the photo-curing resin is transmissive of light having a wavelength in the wavelength curing range when in liquid form and when in hardened form.

12. The apparatus of claim 10, wherein the photo-curing resin has a first specific gravity in a liquid form and a second specific gravity when cured and wherein the second specific gravity is in a range of 90 to 110 percent of the first specific gravity, whereby the formed 3D object is supported by adjacent uncured portions of the photo-curing resin in the print chamber.

13. A 3D printer, comprising:
a tank containing a volume of a photo-curing liquid;
a light source directing light, having a wavelength that initiates curing of the photo-curing liquid, onto a 3D object; and
optics receiving portions of the light reflected from surfaces of the 3D object and, in response, displaying a real image within the photo-curing liquid,
wherein the optics include a first parabolic mirror positioned to focus upon the 3D object and further include a second parabolic mirror receiving the reflected light from the surfaces of the 3D object via reflection from the first parabolic mirror, and
wherein the second parabolic mirror is configured to focus within the tank to provide display the real image.

14. The 3D printer of claim 13, wherein the photo-curing liquid comprises a photopolymer with a first specific gravity when liquid and a second specific gravity when cured to a solid that is within 10 percent of the first specific gravity and wherein the photopolymer has a first transmissivity to light when liquid and a second transmissivity that is substantially equal to the first transmissivity to light when cured to a solid.

15. A 3D printer, comprising:
a tank containing a volume of a photo-curing liquid;
a light source directing light, having a wavelength that initiates curing of the photo-curing liquid, onto a 3D object; and
optics receiving portions of the light reflected from surfaces of the 3D object and, in response, displaying a real image within the photo-curing liquid,
wherein the optics comprise a curved mirror and light source rotating circumferentially about the 3D object and to direct a plurality of linear scan strips into the tank that in combination provide the real image.

16. The 3D printer of claim 15, wherein the photo-curing liquid comprises a photopolymer with a first specific gravity when liquid and a second specific gravity when cured to a solid that is within 10 percent of the first specific gravity and wherein the photopolymer has a first transmissivity to light when liquid and a second transmissivity that is substantially equal to the first transmissivity to light when cured to a solid.

* * * * *